(No Model.) 2 Sheets—Sheet 1.
E. S. FARLEY.
TRY SQUARE.

No. 563,465. Patented July 7, 1896.

Witnesses:

Inventor,
Emerson S. Farley,
By Dewey & Co.
Attys

THE NORRIS PETERS CO., PHOTO-LITHO., WASHINGTON, D. C.

(No Model.) 2 Sheets—Sheet 2.
E. S. FARLEY.
TRY SQUARE.
No. 563,465. Patented July 7, 1896.
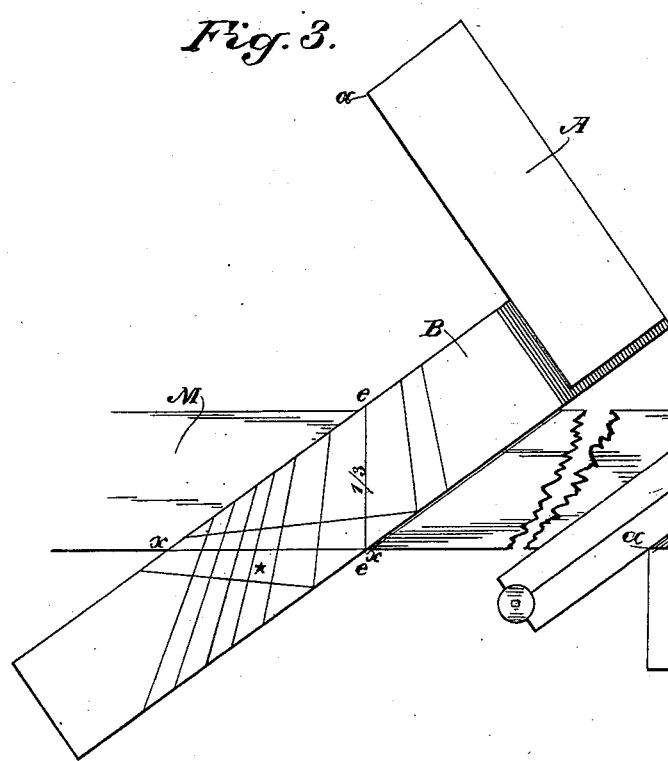
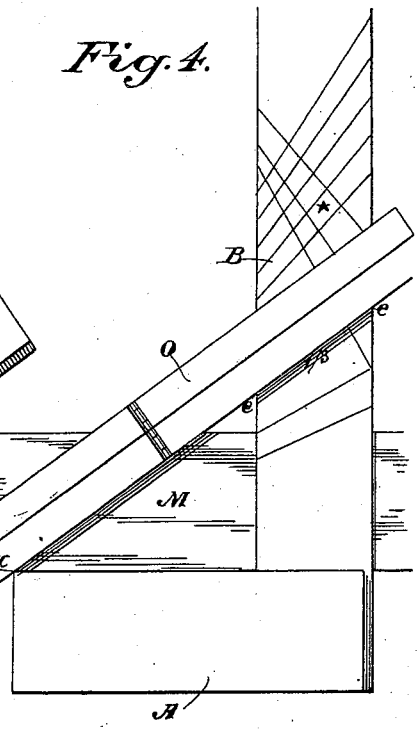
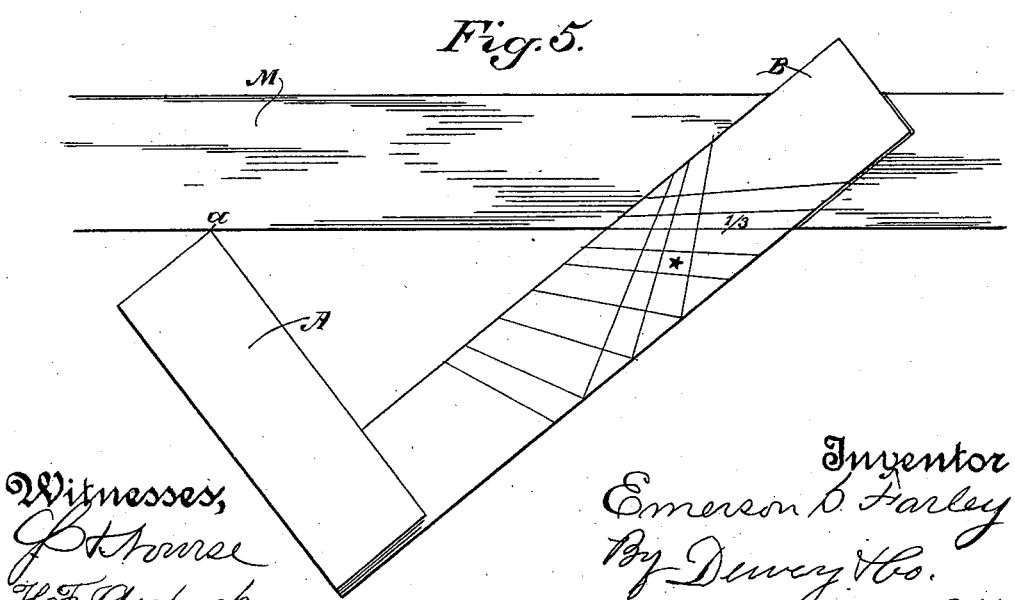
Witnesses,
Inventor,
Emerson S. Farley
By Dewey & Co.
Attys

UNITED STATES PATENT OFFICE.

EMERSON S. FARLEY, OF POMONA, CALIFORNIA.

TRY-SQUARE.

SPECIFICATION forming part of Letters Patent No. 563,465, dated July 7, 1896.

Application filed August 20, 1895. Serial No. 559,929. (No model.)

*To all whom it may concern:*

Be it known that I, EMERSON SMITH FARLEY, a citizen of the United States, residing at Pomona, county of Los Angeles, State of California, have invented an Improvement in Try-Squares; and I hereby declare the following to be a full, clear, and exact description of the same.

My invention relates to the class of try-squares; and it consists in a try-square the blade of which is provided with novel lines or scores for the purpose of obtaining the bevels most used in all regular-pitched roofs.

The object of my invention is to provide a small, convenient, and portable implement for this purpose, adapted to be carried about on scaffold-work with ease and requiring no adjustments, being always in readiness without the use of setting mechanism or thumb-screws.

Figure 1:
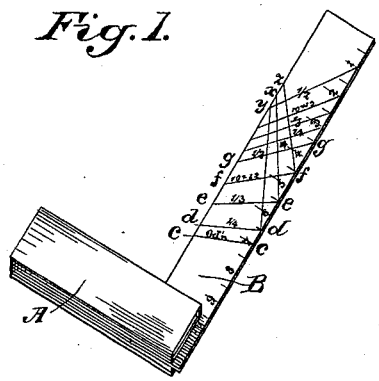
Figure 2:
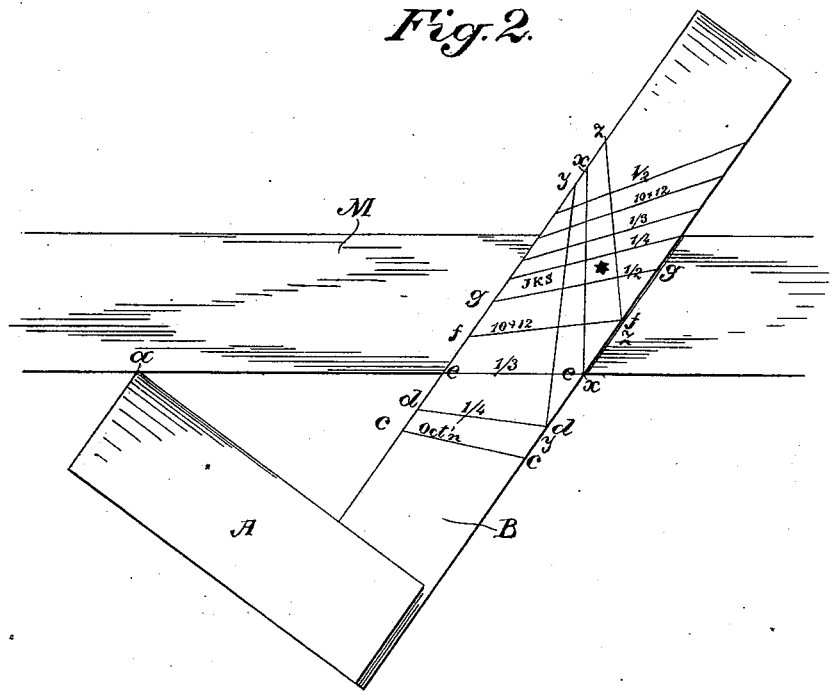

Referring to the accompanying drawings, Figure 1 is a view of my try-square. Fig. 2 is a view showing its application to get the plumb cut of a rafter of one-third pitch. Fig. 3 is a view showing its application to get the foot or bottom cut of the same pitch. Fig. 4 shows another way of getting the same cut. Fig. 5 shows the manner of getting the side cut of a third-pitch jack-rafter.

The try-square is of the usual general shape and construction, being composed of the thick handle A and the thin blade B, which latter is properly graduated along its edges into inches and fractions thereof, as usual. Upon one, or, preferably, upon both faces of the blade, are certain lines or scores which I shall now describe.

The first line *c c*, beginning from the handle, is for the octagon cut or miter. This cut is ordinarily got on a two-foot square, seven inches on the tongue and seventeen inches on the blade. The tongue gives the cut. To get the same cut with my try-square, I place the corner *a* of the handle against the material M to be cut and move the blade until said line *c c* comes immediately over the edge of the material M, when a mark is made across the material by the edge of the blade. The next line *d d* from the handle is marked "¼," which means quarter-pitch, or a rise of six inches in twelve in roof-framing. To get this cut, the tool is used in the same manner as described, and so also with the line *e e*, which is marked "⅓." This line represents one-third pitch or a rise of eight inches in twelve inches in roof-framing.

To get the plumb cut of a rafter of one-third pitch on a framing by the use of a two-foot square, eight inches are taken on the tongue and twelve inches on the blade, and the tongue gives the cut. The blade gives the foot or bottom cut of the rafter. To get this same plumb cut of one-third-pitch rafter on my try-square, I place the corner *a* of the handle against the material to be cut and move the blade along until the line-mark "⅓" is immediately over the edge of the material to be cut, and then scribe a line across the material along the edge of the blade.

To get the foot or bottom cut of a rafter one-third pitch on my try-square, I place the blade of the try-square so that the line *x x*, beginning at the end of and running at right angles with the line *e e*, comes immediately over the edge of the material to be cut, as is shown in Fig. 3, and scribe along the edge of the blade. Another way of getting the same cut is illustrated in Fig. 4, wherein the try-square is placed square across the material to be cut, and a pocket-rule O is laid against the corner of the handle, and on the line *e e*, and the scribe is made along either edge of the rule. The next or fourth line *f f*, marked "10" and "12," represents a rise of ten inches in twelve inches in roof-framing, and its use is the same as the line *e e*. The next or fifth line *g g*, and marked "½," represents one-half pitch or a rise of twelve inches in twelve inches in roof-framing. It is called a "square" miter, and is used more than all the other lines combined. In this pitch the plumb and foot cuts of the rafter are the same.

The star on the blade of the try-square represents a division between the common-rafter cuts and the jack-rafter cuts. The jack-rafter cuts are marked in the drawings "¼," "⅓," "10" and "12," and "½," which correspond with the several pitches to which they belong.

The method of applying the try-square for the side cut, or the cut that fits against a hip or valley rafter of a third-pitch roof, is shown in Fig. 5, and all the other lines are illustrated in the same manner.

It will be seen that all these lines heretofore described, except the line $x\ x$, are in lines converging to the inner corner of the handle of the try-square, which point of convergence enables me to use the instrument to attain the proper results in the most convenient manner by placing the corner of the square against the material to be cut.

The line $x\ x$ and the lines $y\ y$ and $z\ z$ extend at right angles from the ends of the lines which converge to the corner of the handle, and their use has heretofore been described in connection with the line $x\ x$.

The object of this improved try-square is to especially facilitate cornice-work on buildings where the mechanic finds it extremely difficult to carry with him a framing-square and a bevel-square. My square can be carried in the hip-pocket of the mechanic, and is always set for nearly every bevel used in regularly-pitched roofs. No adjusting of bevel-square or others operated with the set-screw need be had, nor need there be any studying of the figures on a framing-square. It is useful also in the workshop, as it is always ready, can be used as a bevel try-square on edge of board, and it is valuable to many who are not carpenters, but who need such a tool.

Having thus described my invention, what I claim as new, and desire to secure by Letters Patent, is—

1. A try-square having a thickened handle and a thin blade, said blade having lines or scores and said handle having the outermost point of the angle of its inner corner serving as a fulcrum and also as a vanishing-point toward which the lines or scores converge.

2. A try-square having on the opposite faces or sides of its blade, lines or scores extending in lines which converge to the extremity of the inner corner of the handle of the square and representing the bevels of regularly-pitched roofs, and other lines or scores extending diagonally across the blade from the ends of said first-named lines and at right angles thereto and representing the foot or bottom cuts of the rafter.

In witness whereof I have hereunto set my hand.

EMERSON S. FARLEY.

Witnesses:
W. H. MACY,
B. F. WHIPP.